(12) United States Patent
Akiyama

(10) Patent No.: US 12,510,815 B2
(45) Date of Patent: Dec. 30, 2025

(54) WAVELENGTH CONVERTER, LIGHT SOURCE APPARATUS, AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 370 days.

(21) Appl. No.: 18/343,832

(22) Filed: Jun. 29, 2023

(65) Prior Publication Data

US 2024/0004280 A1 Jan. 4, 2024

(30) Foreign Application Priority Data

Jun. 29, 2022 (JP) .................................. 2022-104316

(51) Int. Cl.
*G03B 21/20* (2006.01)
(52) U.S. Cl.
CPC ......... *G03B 21/204* (2013.01); *G03B 21/206* (2013.01); *G03B 21/2066* (2013.01); *G03B 21/2073* (2013.01)
(58) Field of Classification Search
None
See application file for complete search history.

(56) References Cited

U.S. PATENT DOCUMENTS

2018/0017856 A1 1/2018 Tanaka et al.
2022/0206376 A1 6/2022 Akiyama

FOREIGN PATENT DOCUMENTS

| JP | 2013-250494 A | 12/2013 | |
|----|---------------|---------|---|
| JP | 2018-013764 A | 1/2018 | |
| JP | 2018-173612 A | 11/2018 | |
| JP | 2022-102085 A | 7/2022 | |
| WO | WO-2012133485 A1 * | 10/2012 | ......... H10H 20/8515 |

* cited by examiner

*Primary Examiner* — Bao-Luan Q Le
*Assistant Examiner* — Dannell L Owens
(74) *Attorney, Agent, or Firm* — Dority & Manning, P.A.

(57) ABSTRACT

A wavelength converter includes, a first optical member including a first optical layer that transmits first light, a wavelength conversion layer that is disposed at a substrate, has a light incident surface, and converts the first light into second light, a light emitting portion, and a second optical member disposed at the light emitting portion and including a second optical layer that reflects the first light and transmits the second light. The first optical layer inclines with respect to the light incident surface and reflects the second light. The wavelength conversion layer includes a first layer that the first light having passed through the first optical layer enters, and a second layer which the first light having passed through the first layer enters. The second layer scatters the first light by a degree greater than the degree by which the first layer scatters the first light.

11 Claims, 6 Drawing Sheets

WAVELENGTH CONVERTER, LIGHT SOURCE APPARATUS, AND PROJECTOR

The present application is based on, and claims priority from JP Application Serial Number 2022-104316, filed Jun. 29, 2022, the disclosure of which is hereby incorporated by reference herein in its entirety.

BACKGROUND

1. Technical Field

The present disclosure relates to a wavelength converter, a light source apparatus, and a projector.

2. Related Art

There has been a proposed light source apparatus that generates illumination light by using fluorescence emitted from a phosphor when the phosphor is irradiated with excitation light emitted from a light source. For example, JP-A-2018-013764 discloses a light source apparatus using a reflective phosphor wheel that emits fluorescence via the surface on which excitation light is incident.

The light source apparatus described above, however, has a problem of insufficient brightness of the illumination light because the fluorescence cannot be efficiently extracted as the illumination light from the light source apparatus.

SUMMARY

To solve the problem described above, according to an aspect of the present disclosure, there is provided a wavelength converter including a substrate having a support surface, a first optical member including a first optical layer that faces the support surface and transmits first light having a first wavelength band and incident from a side opposite from the substrate, a wavelength conversion layer that is disposed at the support surface, has a light incident surface on which the first light that exits out of the first optical layer is incident, and converts the first light into second light having a second wavelength band different from the first wavelength band, a light emitting portion that is formed by at least the substrate and the first optical member and emits light, and a second optical member including a second optical layer that reflects the first light and transmits the second light, and disposed at the light emitting portion. The first optical layer inclines with respect to the light incident surface and reflects the second light. The wavelength conversion layer includes a first layer that the first light passing through the first optical layer enters, and a second layer which is located at a side of the first layer facing the substrate, which the first light passing through the first layer enters, and which scatters the first light by a degree greater than a degree by which the first layer scatters the first light, and part of the first light scattered in the second layer enters the first layer and is converted into the second light.

According to a second aspect of the present disclosure, there is provided a light source apparatus including a light source that outputs the first light, and the wavelength converter according to the first aspect of the present disclosure.

According to a third aspect of the present disclosure, there is provided a projector including the light source apparatus according to the second aspect of the present disclosure, a light modulator that modulates light from the light source apparatus, and a projection optical apparatus that projects the light modulated by the light modulator.

DESCRIPTION OF EXEMPLARY EMBODIMENTS

Figure 1:
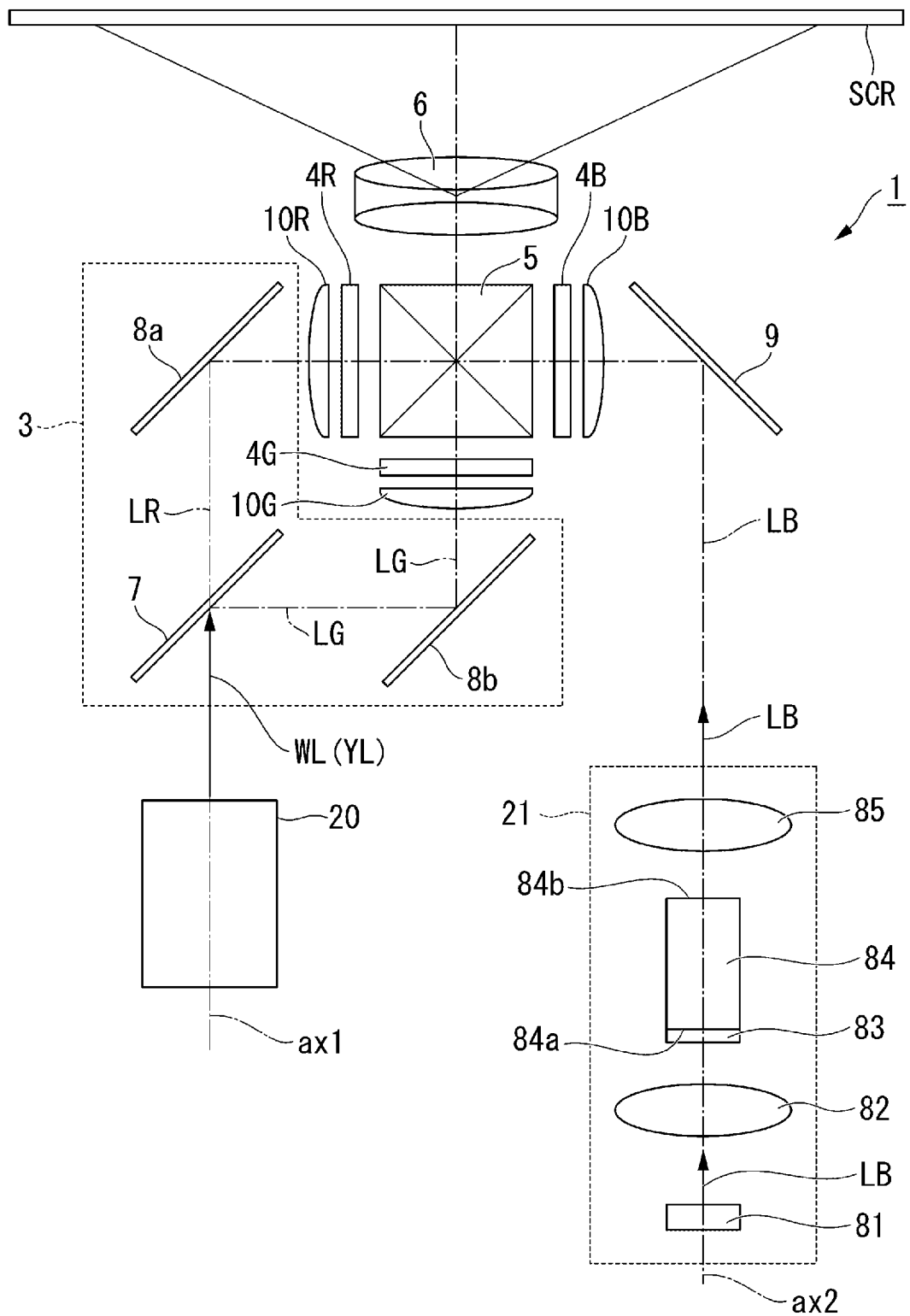
FIG. 1 shows a schematic configuration of a projector according to a first embodiment.

Embodiments of the present disclosure will be described below in detail with reference to the drawings.

In the drawings used in the description below, a characteristic portion is enlarged for convenience in some cases for clarity of the characteristic thereof, and the dimension ratio and other factors of each component are therefore not always equal to actual values.

First Embodiment

An example of a projector according to the present embodiment will be described.

FIG. 1 shows a schematic configuration of the projector according to the present embodiment.

A projector 1 according to the present embodiment is a projection-type image display apparatus that displays color video images on a screen SCR, as shown in FIG. 1. The projector 1 includes a color separation system 3, light modulators 4R, 4G, and 4B, a light combining system 5, a projection optical apparatus 6, a first light source apparatus 20, and a second light source apparatus 21. The first light source apparatus 20 corresponds to an embodiment of the light source apparatus according to the present disclosure.

The color separation system 3 separates yellow illumination light WL from the first light source apparatus 20 into red light LR and green light LG. The color separation system 3 includes a dichroic mirror 7, a first reflection mirror 8a, and a second reflection mirror 8b.

The dichroic mirror 7 separates the illumination light WL into the red light LR and the green light LG. The dichroic mirror 7 transmits the red light LR and reflects the green light LG out of the illumination light WL. The second reflection mirror 8b reflects the green light LG toward the light modulator 4G. The first reflection mirror 8a is disposed in the optical path of the red light LR and reflects the red light LR having passed through the dichroic mirror 7 toward the light modulator 4R.

On the other hand, blue light LB from the second light source apparatus 21 is reflected off a reflection mirror 9 toward the light modulator 4B.

The configuration of the second light source apparatus 21 will now be described.

The second light source apparatus 21 includes a light source 81, a focusing lens 82, a diffuser plate 83, a rod lens 84, and a relay lens 85. The light source 81 is formed of at least one semiconductor laser and emits the blue light LB formed of laser light. The light source 81 is not limited to a semiconductor laser and may instead be an LED that emits blue light.

The focusing lens 82 is formed of a convex lens and causes the blue light LB to be incident on the diffuser plate 83 with the blue light LB substantially focused thereon. The diffuser plate 83 diffuses the blue light LB from the light source 81 by a predetermined degree of diffusion to generate blue light LB having a uniform light orientation distribution close to that of the illumination light WL outputted from the first light source apparatus 20. The diffuser plate 83 can, for example, be a ground glass plate made of optical glass.

The blue light LB diffused by the diffuser plate 83 enters the rod lens 84. The rod lens 84 has a quadrangular columnar shape extending along an illumination optical axis ax2 of the second light source apparatus 21 and has a light incident end surface 84*a* provided at one end and a light exiting end surface 84*b* provided at the other end. The diffuser plate 83 is fixed to the light incident end surface 84*a* of the rod lens 84 via an optical adhesive that is not shown. It is desirable that the refractive index of the diffuser plate 83 match as much as possible with the refractive index of the rod lens 84.

The blue light LB propagates through the rod lens 84 while being totally reflected therein and exits via the light exiting end surface 84*b* with the illuminance distribution uniformity of the blue light LB improved. The blue light LB having exited out of the rod lens 84 enters the relay lens 85. The relay lens 85 causes the blue light LB having the illuminance distribution uniformity improved by the rod lens 84 to be incident on the reflection mirror 9.

The light exiting end surface 84*b* of the rod lens 84 has a rectangular shape substantially similar to the shape of an image formation region of the light modulator 4B. The blue light LB having exited out of the rod lens 84 is thus efficiently incident on the image formation region of the light modulator 4B.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulators 4R, 4G, and 4B are each, for example, a transmissive liquid crystal panel. Polarizers that are not shown are disposed on the light incident side and the light exiting side of each of the liquid crystal panels and configured to transmit only linearly polarized light polarized in a specific direction.

Field lenses 10R, 10G, and 10B are disposed on the light incident side of the light modulators 4R, 4G, and 4B, respectively. The field lenses 10R, 10G, and 10B parallelize the chief beams of the red light LR, the green light LG, and the blue light LB to be incident on the respective light modulators 4R, 4G, and 4B.

The light combining system 5 receives the image light outputted from the light modulators 4R, 4G, and 4B, combines the image light corresponding to the red light LR, the image light corresponding to the green light LG, and the image light corresponding to the blue light LB with one another, and outputs the combined image light toward the projection optical apparatus 6. The light combining system 5 is, for example, a cross dichroic prism.

The projection optical apparatus 6 is formed of a plurality of lenses. The projection optical apparatus 6 enlarges the combined image light from the light combining system 5 and projects the enlarged image light toward the screen SCR. An image is thus displayed on the screen SCR.

First Light Source Apparatus

Figure 2:
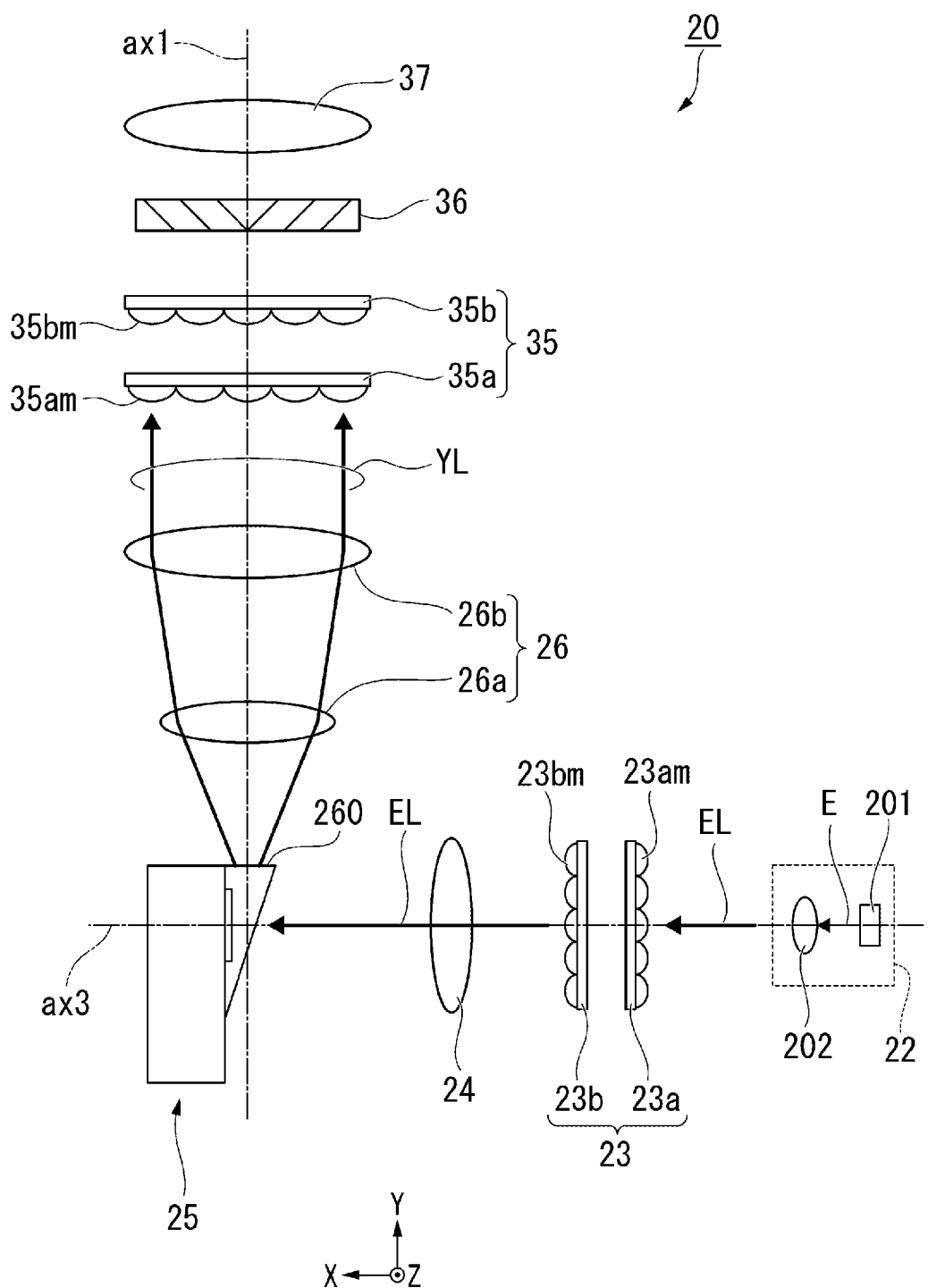
FIG. 2 is a schematic configuration diagram of a first light source apparatus.

FIG. 2 is a schematic configuration diagram of the first light source apparatus 20.

In the following drawings including FIG. 2, each component of the first light source apparatus 20 will be described by using an XYZ coordinate system as required. The axis X is an axis parallel to an optical axis ax3 of a light source 22, the axis Y is an axis perpendicular to the optical axis ax3 of the light source 22 and parallel to an illumination optical axis ax1 of the first light source apparatus 20, and the axis Z is an axis perpendicular to the axes X and Y. That is, the optical axis ax3 and the illumination optical axis ax1 are present in the same plane, and the optical axis ax3 is perpendicular to the illumination optical axis ax1.

The first light source apparatus 20 includes the light source 22, a homogenizer system 23, a focusing system 24, a wavelength converter 25, a pickup system 26, an optical integration system 35, a polarization converter 36, and a superimposing lens 37, as shown in FIG. 2.

The light source 22 includes a light emitter 201 and a collimation lens 202. The light emitter 201 is formed of a plurality of semiconductor lasers. The light emitter 201 emits a plurality of light beams E. Each of the light beams E is formed of light having a blue wavelength band (first wavelength band) ranging from 400 nm to 480 nm and is, for example, a light beam having a peak wavelength of 455 nm.

The collimation lens 202 is disposed in correspondence with the light emitter 201. The collimation lens 202 converts the light beams E emitted from the light emitter 201 into parallelized light. The number of light emitters 201 and collimation lenses 202 is not limited to a specific number.

The light source 22 thus emits excitation light (first light) EL formed of the parallelized luminous flux and having the blue wavelength band (first wavelength band). In the present embodiment, the light source 22 emits linearly polarized blue light as the excitation light EL.

In the first light source apparatus 20 according to the present embodiment, the light source 22, the homogenizer system 23, the focusing system 24, and the wavelength converter 25 are disposed along the optical axis ax3 of the light source 22.

The excitation light EL emitted from the light source 22 enters the homogenizer system 23. The homogenizer system 23 is formed, for example, of a lens array 23*a* and a lens array 23*b*. The lens array 23*a* includes a plurality of lenslets 23*am*, and the lens array 23*b* includes a plurality of lenslets 23*bm*.

The lens array 23*a* separates the excitation light EL into a bundle of a plurality of thin beams. The lenslets 23*am* of the lens array 23*a* bring the bundle of thin beams into focus at the corresponding lenslets 23*bm* of the lens array 23*b*. The lens array 23*b*, along with the focusing optical system 24, which will be described later, superimposes images of the lenslets 23*am* of the lens array 23*a* on a phosphor layer 251 of the wavelength converter 25.

The focusing system 24 cooperates with the homogenizer system 23 to homogenize the illuminance distribution of the excitation light EL to be incident on the phosphor layer 251 of the wavelength converter 25. The focusing system 24 is formed of a single lens or a plurality of lenses.

The wavelength converter 25 generates fluorescence YL when excited by the excitation light EL incident from the light source 22 toward the positive end of the direction X, and emits the generated fluorescence YL via a light emitting portion 260.

Figure 3:
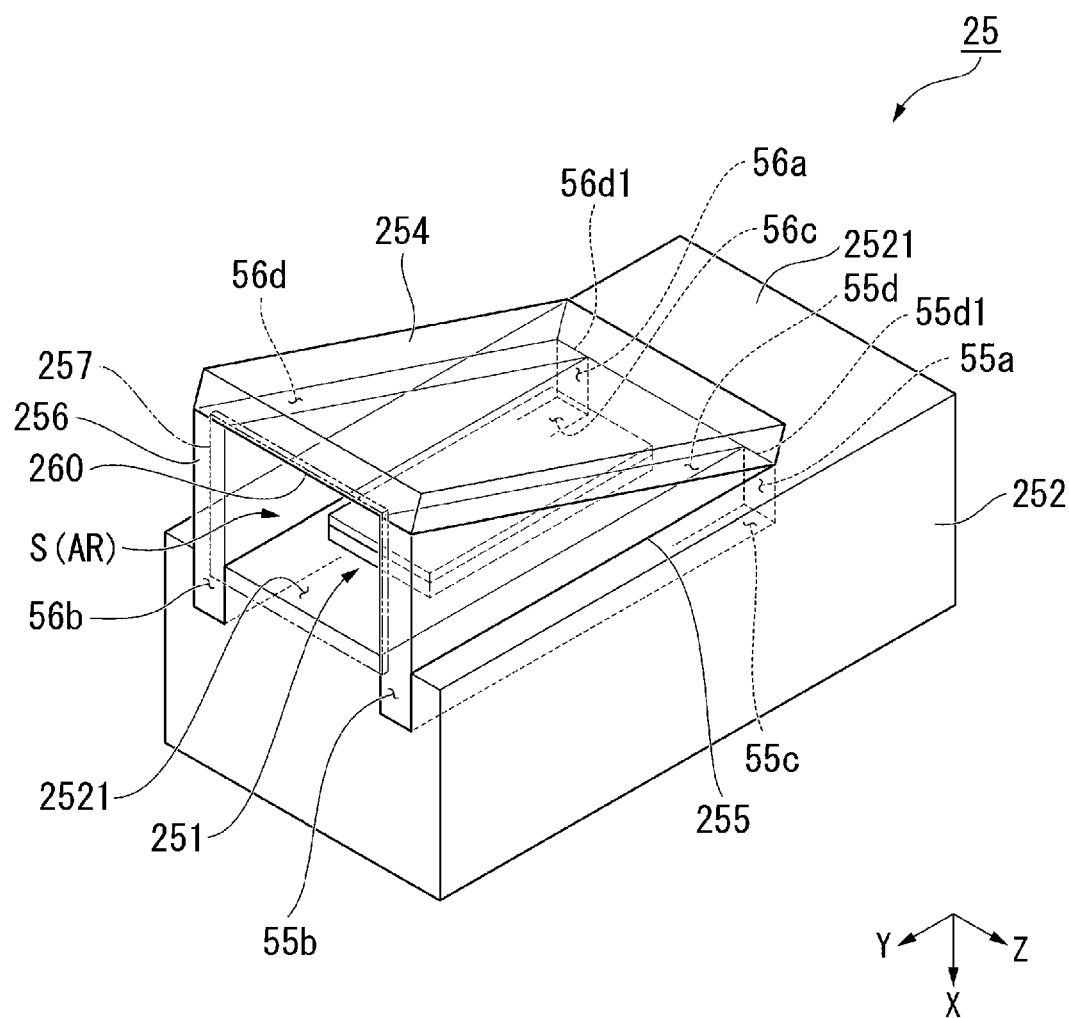
FIG. 3 is a perspective view showing the configurations of key parts of a wavelength converter.
Figure 4:
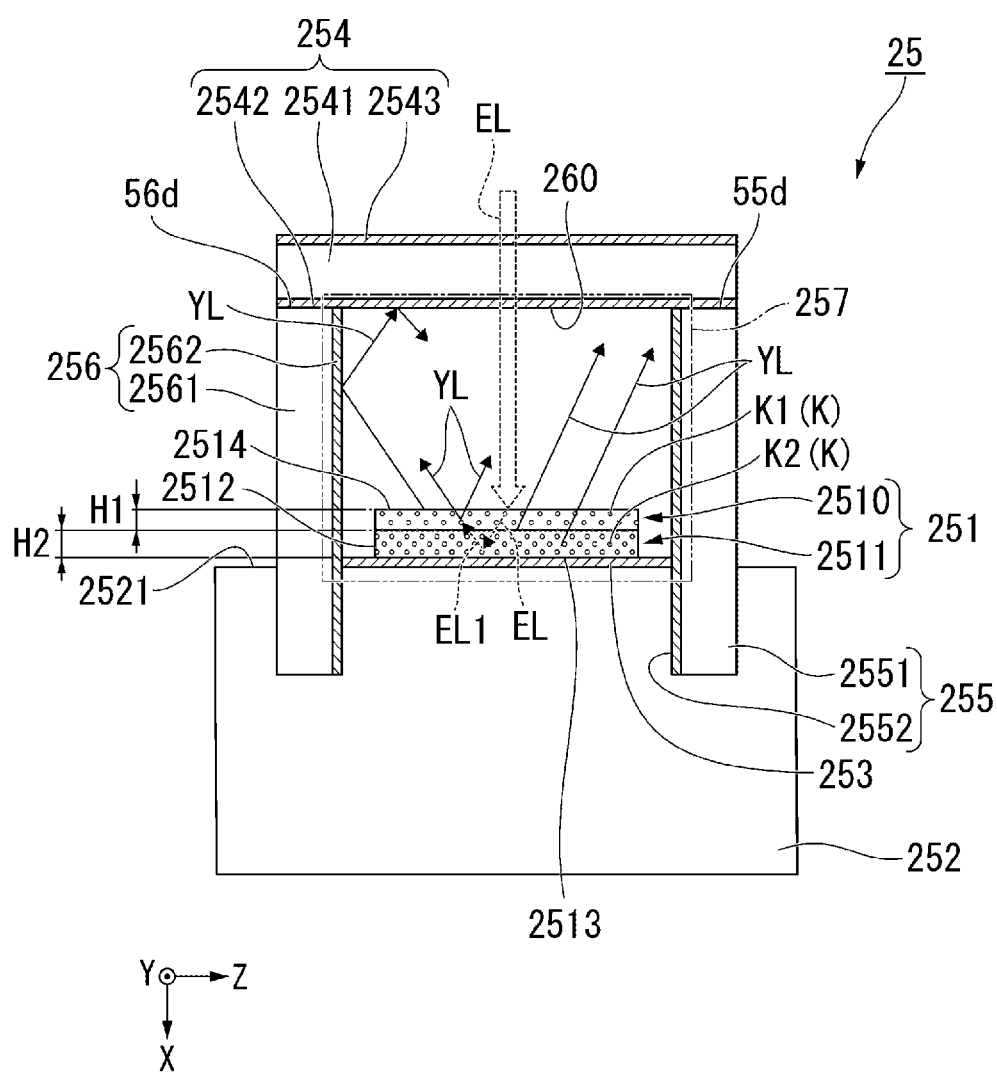
FIG. 4 is a front view of the wavelength converter.
Figure 5:
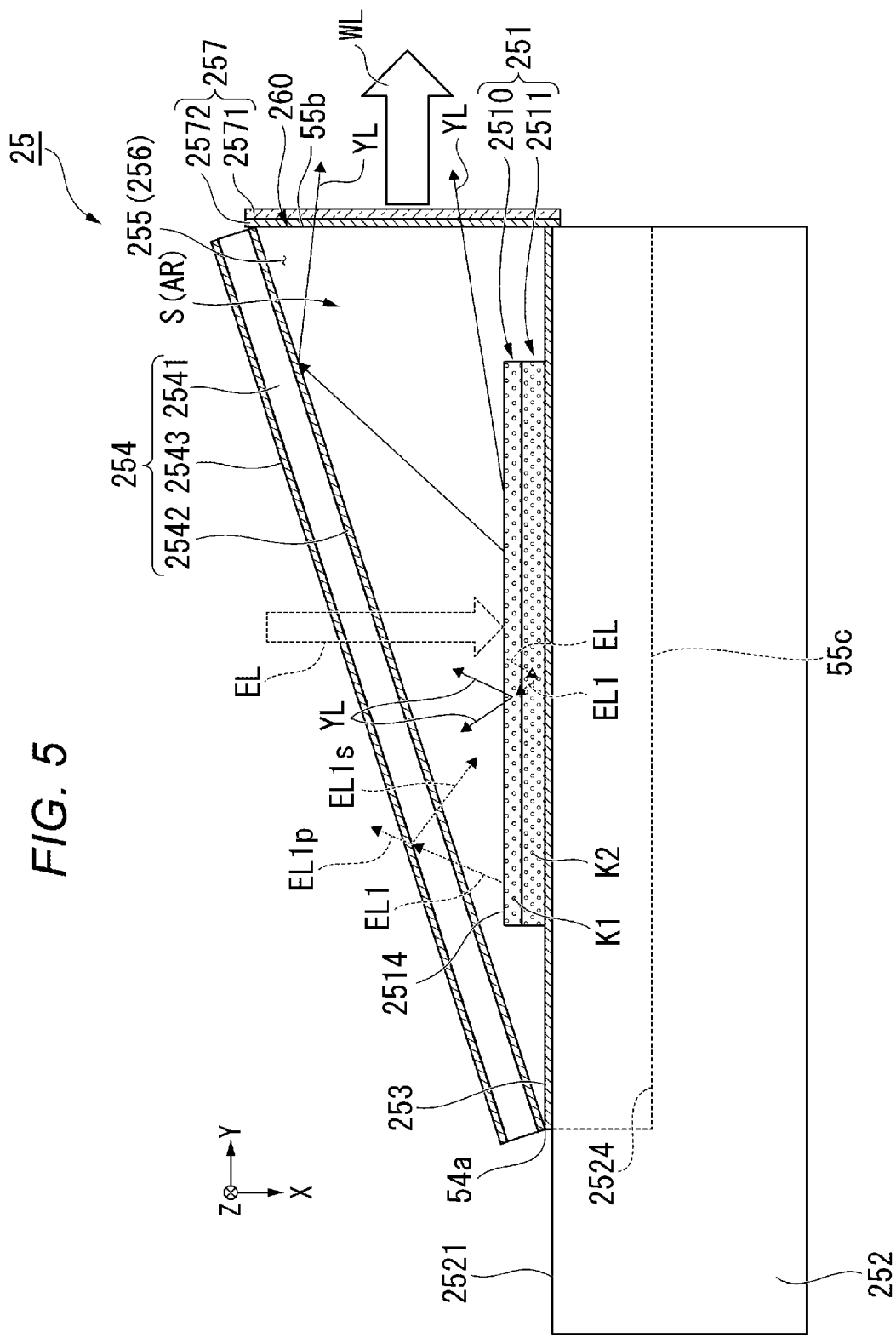
FIG. 5 is a cross-sectional view of the wavelength converter.

The configuration of the wavelength converter 25 will be subsequently described in detail. FIG. 3 is a perspective view showing the configurations of key parts of the wavelength converter 25. FIG. 4 is a front view of the wavelength converter 25 viewed from the side facing the positive end of the direction Y. FIG. 5 is a cross-sectional view of the wavelength converter 25 taken along a plane along the plane XY.

The wavelength converter 25 according to the present embodiment includes the phosphor layer (wavelength conversion layer) 251, a substrate 252, a mirror layer 253, a first optical member 254, a second optical member 257, a third optical member 255, a fourth optical member 256, and the light emitting portion 260, as shown in FIGS. 3 to 5.

The light emitting portion 260 in the present embodiment is an aperture formed by end surfaces of the substrate 252, the first optical member 254, the third optical member 255 and the fourth optical member 256, the end surfaces facing the positive end of the direction Y. The light emitting portion 260 emits the fluorescence generated in the phosphor layer 251.

In the wavelength converter 25 according to the present embodiment, the phosphor layer 251 is housed in a housing space S surrounded by the substrate 252, the first optical member 254, the second optical member 257, the third optical member 255, and the fourth optical member 256. The housing space S is provided, for example, with an air layer AR.

The substrate 252 has a support surface 2521, which supports the phosphor layer 251. The support surface 2521 is a surface parallel to the plane YZ. The substrate 252 is thermally coupled to the phosphor layer 251. The substrate 252 is, for example, a plate made of metal that excels in heat dissipation, such as aluminum and copper. The substrate 252, which is thermally coupled to the phosphor layer 251, dissipates the heat of the phosphor layer 251 to cool the phosphor layer 251.

The phosphor layer 251 is supported by the support surface 2521 of the substrate 252.

The phosphor layer 251 is formed of sintered phosphor particles that convert excitation light EL in terms of wavelength into fluorescence YL. The phosphor particles can, for example, be yttrium-aluminum-garnet-based (YAG-based) phosphor particles. The phosphor particles may be made of one type of material, or a mixture of particles made of two or more materials may be used as the phosphor particles.

The phosphor layer 251 generates the fluorescence YL, which belongs to a yellow wavelength band (second wavelength band), for example, ranging from 490 to 750 nm.

The mirror layer 253 is provided between the substrate 252 and the phosphor layer 251. The area of the mirror layer 253 is greater than the area of a rear surface 2513 of the phosphor layer 251. In the present embodiment, the mirror layer 253 is provided on the support surface 2521 located in the housing space S. That is, the mirror layer 253 is provided around the phosphor layer 251 at the support surface 2521 of the substrate 252. The phosphor layer 251 is bonded to the support surface 2521 of the substrate 252 via the mirror layer 253. The mirror layer 253 is formed, for example, of a metal or dielectric layer. The mirror layer 253 may be provided across the entire support surface 2521, that is, may also cover the support surface 2521 outside the housing space S. Part of the mirror layer 253 may be formed directly at the rear surface 2513 of the phosphor layer 251.

The first optical member 254 is disposed so as to face the support surface 2521 of the substrate 252. That is, the first optical member 254 is disposed so as to face a front surface 2514 of the phosphor layer 251, which is the light incident surface. The first optical member 254 is disposed so as not to be in contact with the phosphor layer 251.

The first optical member 254 is disposed so as to incline with respect to the front surface 2514 of the phosphor layer 251. The angle of the first optical member 254 with respect to the front surface 2514 of the phosphor layer 251 is set at an acute angle.

The first optical member 254 includes a light transmissive substrate 2541, a first optical layer 2542, and a third optical layer 2543. The light transmissive substrate 2541 is formed of a light transmissive member made, for example, of alumina, sapphire, or glass.

The third optical layer 2543 is provided at the outer surface of the light transmissive substrate 2541, that is, at the side closer to the light source 22 than the first optical layer 2542. The third optical layer 2543 is a polarization separation layer having a polarization separation characteristic that causes P-polarized light (first light having first wavelength band and polarized in first direction) out of light having the blue wavelength band to pass through the third optical layer 2543 and S-polarized light (first light having first wavelength band and polarized in second direction different from first direction) to be reflected off the third optical layer 2543 to separate the light having the blue wavelength band into the P-polarized light and the S-polarized light.

In the present embodiment, the light source 22 is configured to emit P-polarized light (light polarized in first direction) with respect to the third optical layer 2543 as the excitation light EL. The excitation light EL emitted from the light source 22 therefore passes through the third optical layer 2543.

The excitation light EL having passed through the third optical layer 2543 is incident on the inner surface of the first optical member 254, that is, enters the first optical layer 2542 provided at the side facing the phosphor layer 251. The first optical layer 2542 is formed of a dichroic layer characterized so as to transmit the excitation light EL emitted from the light source 22 and incident via the side opposite from the substrate 252 and reflect the fluorescence YL emitted from the phosphor layer 251. The excitation light EL passes through the first optical member 254 and enters the phosphor layer 251. The phosphor layer 251 is excited by the excitation light EL and radiates the fluorescence YL in the form of Lambertian emission.

The third optical member 255 includes a base 2551 and a fourth optical layer 2552. The material of which the base 2551 is made is, for example, glass. The fourth optical layer 2552 is formed at the inner surface of the base 2551. The fourth optical layer 2552 is formed, for example, of a metal or dielectric layer.

The third optical member 255 is disposed so as to intersect with the support surface 2521 of the substrate 252 and the first optical member 254. The third optical member 255 is so disposed that the fourth optical layer 2552 intersects with the support surface 2521 and the first optical layer 2542. The third optical member 255 may be perpendicular to the support surface 2521 of the substrate 252 and the first optical member 254. The fourth optical layer 2552 may be perpendicular to the support surface 2521 and the first optical layer 2542. The third optical member 255 is so disposed that the thickness direction thereof coincides with the axis-Z direction. The third optical member 255 is disposed in the vicinity of the phosphor layer 251 at the side facing the positive end of the direction Z. The fluorescence YL emitted from the phosphor layer 251 toward the positive end of the direction Z is therefore reflected off the fourth optical layer 2552 of the third optical member 255. The third optical member 255 reflects not only the fluorescence YL but the excitation light EL.

The third optical member 255 is a plate having a trapezoidal shape.

The third optical member 255 has a first end surface 55a, which forms the top base of the trapezoidal shape, a second end surface 55b, which forms the bottom base of the trapezoidal shape, a third end surface 55c, which couples the first end surface 55a to the second end surface 55b at the side facing the positive end of the direction X, and a fourth end surface 55d, which couples the first end surface 55a to the second end surface 55b at the side facing the negative end of the direction X, as shown in FIG. 3. The first end surface 55a, the second end surface 55b, the third end surface 55c and the fourth end surface 55d are each a flat surface. The third end surface 55C is a surface facing the substrate 252. The fourth end surface 55d is a surface of the base 2551 that is opposite from the third end surface 55c. The first optical member 254 is in contact with the fourth end surface 55d. The first optical member 254 is placed at the fourth end surface 55d. The first optical layer 2542 is in contact with the fourth end surface 55d. The light transmissive substrate 2541 is placed at the fourth end surface 55d via the first optical layer 2542.

To use glass as the material of the base 2551, it is necessary to carry out a chamfering process of removing sharp portions to prevent chipping. In the present embodiment, the third optical member 255 is a plate having a trapezoidal shape and therefore requires no chamfering, whereby the processability of the base 2551 is improved.

In the present embodiment, part of the third optical member 255 is buried in the substrate 252. The third optical member 255 is therefore firmly supported by the substrate 252.

Part of an end portion of the third optical member 255 that is the end portion facing the positive end of the direction X is fitted into a groove 2524 formed at the support surface 2521 of the substrate 252. A gap between the third optical member 255 and the groove 2524 may be filled with an adhesive.

Specifically, the third optical member 255 is so configured that the entire first end surface 55a and third end surface 55c and part of the second end surface 55b are fitted into the groove 2524. An end edge 55d1 of the fourth end surface 55d, the end edge closest to the negative end of the direction Y and extending along the direction Z, is flush with the support surface 2521 of the substrate 252. The fourth end surface 55d is thus smoothly coupled to the support surface 2521 of the substrate 252. Furthermore, the second end surface 55b is flush with the end surface of the substrate 252 at the side facing the positive end of the direction Y.

The fourth optical member 256 has the same configuration as that of the third optical member 255.

That is, the fourth optical member 256 includes a base 2561 and a fifth optical layer 2562. The fifth optical layer 2562 is formed at the inner surface of the base 2561. The fifth optical layer 2562 is formed, for example, of a metal or dielectric layer.

The fourth optical member 256 is disposed so as to intersect with the support surface 2521 of the substrate 252 and the first optical member 254 and face the third optical member 255. The fourth optical member 256 is so disposed that the fifth optical layer 2562 intersects with the support surface 2521 and the first optical layer 2542 and faces the fourth optical layer 2552. The fourth optical member 256 may be perpendicular to the support surface 2521 of the substrate 252 and the first optical member 254. The fifth optical layer 2562 may be perpendicular to the support surface 2521 and the first optical layer 2542. The fourth optical member 256 is so disposed that the thickness direction thereof coincides with the axis-Z direction. The fourth optical member 256 is disposed in the vicinity of the phosphor layer 251 at the side facing the negative end of the direction Z. The fluorescence YL emitted from the phosphor layer 251 toward the negative end of the direction Z and incident on the fourth optical member 256 is therefore reflected off the fifth optical layer 2562 of the fourth optical member 256. The fourth optical member 256 reflects not only the fluorescence YL but the excitation light EL.

The fourth optical member 256 is a plate having the same trapezoidal shape as the shape of the third optical member 255.

The fourth optical member 256 has a first end surface 56a, which forms the top base of the trapezoidal shape, a second end surface 56b, which forms the bottom base of the trapezoidal shape, a third end surface 56c, which couples the first end surface 56a to the second end surface 56b at the side facing the positive end of the direction X, and a fourth end surface 56d, which couples the first end surface 56a to the second end surface 56b at the side facing the negative end of the direction X. The first end surface 56a, the second end surface 56b, the third end surface 56c, and the fourth end surface 56d are each a flat surface. The third end surface 56c is a surface facing the substrate 252. The fourth end surface 56d is a surface of the base 2561 that is opposite from the third end surface 56c. The first optical member 254 is in contact with the fourth end surface 56d. The first optical member 254 is placed on the fourth end surface 56d. The first optical layer 2542 is in contact with the fourth end surface 56d. The light transmissive substrate 2541 is placed at the fourth end surface 56d via the first optical layer 2542.

In the present embodiment, part of the fourth optical member 256 is buried in the substrate 252, so that the fourth optical member 256 is firmly supported by the substrate 252.

Part of an end portion of the fourth optical member 256 that is the end portion facing the positive end of the direction X is fitted into another groove 2524 formed at the support surface 2521 of the substrate 252. A gap between the fourth optical member 256 and the groove 2524 may be filled with an adhesive.

Specifically, the fourth optical member 256 is so configured that the entire first end surface 56a and third end surface 56c and part of the second end surface 56b are fitted into the groove 2524. An end edge 56d1 of the fourth end surface 56d, the end edge closest to the negative end of the direction Y and extending along the direction Z, is flush with the support surface 2521 of the substrate 252. The fourth end surface 56d is thus smoothly coupled to the support surface 2521 of the substrate 252. Furthermore, the second end surface 56b is flush with the end surface of the substrate 252 at the side facing the positive end of the direction Y.

In the present embodiment, the first optical member 254 is supported by the third optical member 255 and the fourth optical member 256. The first optical member 254 is bonded and fixed to the third optical member 255 and the fourth optical member 256.

Specifically, the first optical member 254 is provided so as to extend between the fourth end surface 55d of the third optical member 255 and the fourth end surface 56d of the fourth optical member 256. An inner end edge 54a of the first optical member 254 is in contact with the support surface 2521 of the substrate 252 at the side facing the negative end of the direction Y.

Based on the configuration described above, the light emitting portion 260 of the wavelength converter 25 according to the present embodiment is formed by the substrate 252, the first optical member 254, the third optical member 255, and the fourth optical member 256, which has a closed end facing the negative end of the direction Y and an open end facing the positive end of the direction Y. The wavelength converter 25 therefore prevents leakage of the fluorescence YL in the direction away from the light emitting portion 260 but allows efficient output of the light via the light emitting portion 260.

In the wavelength converter 25 according to the present embodiment, the second optical member 257 is disposed so as to cover the light emitting portion 260, as shown in FIG. 5. The second optical member 257 includes a light transmissive substrate 2571 and a second optical layer 2572. The light transmissive substrate 2571 is formed, for example, of a thin glass plate. The second optical layer 2572 is formed of a dichroic layer that transmits the fluorescence YL (second light) having the yellow wavelength band (second wavelength band) ranging from 550 to 640 nm and reflects light having the blue wavelength band, within which the excitation light EL falls.

The light emitting portion 260 can therefore selectively extract yellow light containing the fluorescence YL as the illumination light WL via the second optical member 257.

The phosphor layer 251 in the present embodiment includes a first layer 2510 and a second layer 2511. The first layer 2510 and the second layer 2511 are sintered into a single piece. The first layer 2510 and the second layer 2511 of the phosphor layer 251 are therefore bonded to each other without use of any adhesive.

The first layer 2510 is a layer that is located at a position facing the negative end of the direction X, which is the side of the second layer 2511 on which the excitation light EL is incident, and faces the first optical member 254. The excitation light EL having passed through the first optical layer 2542 of the first optical member 254 is incident on the first layer 2510, as will be described later.

The second layer 2511 is a layer located at a position facing the positive end of the direction X, which is the side of the first layer 2510 facing the substrate 250. The excitation light EL having passed through the first layer 2510 is incident on the second layer 2511, as will be described later.

The phosphor layer 251 is a plate-shaped phosphor having a side surface 2512, the rear surface 2513, and the front surface (light incident surface) 2514. The front surface 2514 is the surface on which the excitation light EL is incident and corresponds to the surface of the first layer 2510 that faces the negative end of the direction X. The side surface 2512 is a surface that intersects with the front surface 2514 and corresponds to the side surfaces of the first layer 2510 and the second layer 2511. The side surface 2512 may be perpendicular to the front surface 2514. The rear surface 2513 is the surface opposite from the front surface 2514 and corresponds to the surface of the second layer 2511 that is in contact with the substrate 252 and faces the positive end of the direction X.

The first layer 2510 and the second layer 2511 may be bonded to each other via optical contact into a single piece. The optical contact is a bonding technology using the following phenomenon: Two surfaces to be bonded to each other are precisely polished so that the molecules of the surfaces are unstable; and the surfaces are then caused to come into intimate contact with each other so that the interaction between the molecules of the surfaces achieves a stable contact state. Using optical contact allows the first layer 2510 and the second layer 2511 to be bonded to each other without using any adhesive.

The phosphor layer 251 may instead be formed by bonding a first layer 2510 and a second layer 2511 made of different phosphor materials to each other. For example, the first layer 2510 may be made of a single crystal phosphor, and the second layer 2511 may be formed of a binder made of an organic or inorganic material in which a plurality of phosphor particles are dispersed.

The phosphor layer 251 in the present embodiment contains a plurality of scatterers K. The plurality of scatterers K are pores or scattering particles having a refractive index different from that of the phosphor. In the present embodiment, the plurality of scatterers K are pores.

In the present embodiment, the plurality of scatterers K include a plurality of first scatterers K1 and a plurality of second scatterers K2. The plurality of first scatterers K1 are pores contained in the first layer 2510, and the plurality of second scatterers K2 are pores contained in the second layer 2511.

In the present embodiment, the degree by which the excitation light EL is scattered in the second layer 2511 is greater than the degree by which the excitation light EL is scattered in the first layer 2510. Since the degree by which light is scattered can be adjusted by adjusting the content of the scatterers per volume of the phosphor, the content of the second scatterers K2 per volume of the second layer 2511 is greater than the content of the first scatterers K1 per volume of the first layer 2510.

The content of scatterers is defined, for example, by the number, the average particle size, and other factors of scatterers contained in the phosphor. In the present embodiment, the number of second scatterers K2 contained in the second layer 2511 is greater than the number of first scatterers K1 contained in the first layer 2510.

Based on the configuration described above, the first layer 2510 suppresses scattering of light as compared with the second layer 2511, so that the excitation light EL incident from the light source 22 is likely to travel and pass through the phosphor without being scattered. That is, the first layer 2510, which is configured to reduce the degree by which light is scattered, can suppress the efficiency at which the excitation light EL is converted into the fluorescence YL to a small value.

In the present embodiment, a thickness H2 of the second layer 2511 is greater than a thickness H1 of the first layer 2510. That is, the thickness H1 of the first layer 2510 is smaller than the thickness H2 of the second layer 2511. The thickness of the first layer 2510 and the thickness of the second layer 2511 are each a dimension along the direction of a normal to the support surface 2521, at which the phosphor layer 251 is provided, in other words, a dimension along the direction of a normal to the front surface 2514 (light incident surface) of the phosphor layer 251.

In general, the thinner the phosphor, the more readily the excitation light exits from the phosphor before converted into the fluorescence. That is, the efficiency at which the excitation light is converted into the fluorescence decreases as the thickness of the fluorophore decreases.

The phosphor layer 251 in the present embodiment, in which the degree of scattering in the first layer 2510 and the thickness thereof are smaller than those in the second layer 2511 as described above, suppresses the efficiency at which the excitation light EL is converted into the fluorescence YL. A large portion of the excitation light EL emitted from the light source 22 therefore passes through the first layer 2510 without being converted into the fluorescence YL and enters the second layer 2511 provided at the side facing the substrate 252.

The second layer 2511 has higher fluorescence conversion efficiency than that of the first layer 2510, as described above. The excitation light EL having passed through the first layer 2510 is therefore efficiently converted into the fluorescence YL when entering the second layer 2511.

The phosphor layer 251 in the present embodiment, in which the fluorescence conversion efficiency in the first layer 2510 is lowered while the fluorescence conversion efficiency in the second layer 2511 is raised, suppresses a decrease in the fluorescence conversion efficiency in the entire phosphor layer.

In the wavelength converter 25 according to the present embodiment, the fluorescence YL generated in the second layer 2511 passes through the first layer 2510 and exits via the front surface 2514 of the phosphor layer 251. The fluorescence YL generated in the second layer 2511 exits in some case via the side surface of the first layer 2510 or the side surface of the second layer 2511.

In the second layer 2511, part of the excitation light EL is scattered backward and enters the first layer 2510. The excitation light EL backscattered in the second layer 2511 is hereinafter referred to as excitation light EL1. Since the excitation light EL1 scattered in a variety of directions enters the first layer 2510, the excitation light EL1 is efficiently converted into the fluorescence YL in the first layer 2510.

The phosphor layer 251 in the present embodiment, in which the first layer 2510 converts the excitation light EL1 backscattered in the second layer 2511 into the fluorescence YL, efficiently converts the excitation light EL emitted from the light source 22 into the fluorescence YL.

Part of the fluorescence YL emitted from the phosphor layer 251 directly travels toward the light emitting portion 260, passes through the second optical member 257, which covers the light emitting portion 260, and exits out thereof, as described above. Another part of the fluorescence YL enters the first optical member 254. The fluorescence YL having entered the first optical member 254 is reflected off the first optical layer 2542. At least part of the fluorescence YL reflected off the first optical layer 2542 travels toward the light emitting portion 260, passes through the second optical member 257, which covers the light emitting portion 260, and exits out thereof.

Another part of the fluorescence YL having exited out of the first optical member 254 is incident on the support surface 2521 of the substrate 252, and reflected off the mirror layer 253 formed at the support surface 2521. At least part of the fluorescence YL reflected off the mirror layer 253 travels toward the light emitting portion 260, passes through the second optical member 257, which covers the light emitting portion 260, and exits out thereof.

Still another part of the fluorescence YL having exited out of the first optical member 254 enters the third optical member 255 or the fourth optical member 256 via the mirror layer 253 or directly enters the third optical member 255 or the fourth optical member 256. The fluorescence YL is then reflected off the third optical member 255 or the fourth optical member 256, travels toward the light emitting portion 260, passes through the second optical member 257, which covers the light emitting portion 260, and exits out thereof.

Still another part of the fluorescence YL having exited out of the first optical member 254 propagates in the direction away from the light emitting portion 260 (toward negative end of direction Y), and eventually travels toward the light emitting portion 260 after undergoing repeated reflection, passes through the second optical member 257, which covers the light emitting portion 260, and exits out thereof. The wavelength converter 25 according to the present embodiment thus allows the fluorescence YL generated in the phosphor layer 251 to exit out of the light emitting portion 260.

In the present embodiment, another part of the excitation light EL1 exits out of the phosphor layer 251 in some cases without being converted into the fluorescence YL in the first layer 2510. Another part of the excitation light EL1 directly exits in some cases via the side surface of the second layer 2511 without entering the first layer 2510.

The part of the excitation light EL1 emitted from the phosphor layer 251 without being converted into the fluorescence YL as described above passes through the first optical layer 2542 and the light transmissive substrate 2541 and reaches the third optical layer 2543 in some cases.

In the present embodiment, the excitation light EL1 backscattered in the second layer 2511 forms unpolarized light that is a mixture of S-Polarized light and P-Polarized light. The excitation light EL1 is therefore separated in the third optical layer 2543 into the P-polarized component and the S-polarized component.

Specifically, an S-polarized component EL1s of the excitation light EL1 separated by the third optical layer 2543 is reflected off the third optical layer 2543 and enters the phosphor layer 251 again to be used to generate the fluorescence YL.

On the other hand, a p-polarized component EL1p of the excitation light EL1 separated by the third optical layer 2543 passes through the third optical layer 2543 and exits out of the first optical member 254, resulting in loss. The P-polarized component EL1p is, however, a very small fraction of the amount of excitation light EL emitted from the light source 22 and is therefore negligible or causes no problem in practice.

In the wavelength converter 25 according to the present embodiment, the side of the phosphor layer 251 having the negative end of the direction Y, which is the side opposite from the light emitting portion 260, tends to confine more heat and become hotter than the side facing the light emitting portion 260, which outputs the fluorescence YL. In contrast, in the wavelength converter 25 according to the present embodiment, the substrate 252, which supports the phosphor layer 251, has a shape elongated in the direction away from the light emitting portion 260, as shown in FIGS. 3 and 5. The wavelength converter 25 according to the present embodiment therefore allows efficient cooling of the side of the phosphor layer 251 that tends to confine the heat, the side opposite from the light emitting portion 260. The phosphor layer 251 can therefore be efficiently cooled.

The illumination light WL containing the fluorescence YL thus emitted from the wavelength converter 25 enters the pickup system 26. The pickup system 26 is formed, for example, of pickup lenses 26a and 26b. The pickup system 26 has the function of picking up and parallelizing the illumination light WL emitted from the wavelength converter 25.

The illumination light WL enters the optical integration system 35. The optical integration system 35 is formed, for example, of a first lens array 35a and a second lens array 35b.

The first lens array 35a includes a plurality of first lenslets 35am, and the second lens array 35b includes a plurality of second lenslets 35bm.

The first lens array 35a separates the illumination light WL into a plurality of thin pencils of light. The first lenslets 35am bring the thin pencils of light into focus at the corresponding second lenslets 35bm. The optical integration system 35 cooperates with the superimposing lens 37, which will be described later, to homogenize the illuminance distribution in image formation regions of the light modulators 4R and 4G shown in FIG. 1, which are illumination receiving regions.

The illumination light WL having passed through the optical integration system 35 enters the polarization converter 36. The polarization converter 36 is formed, for example, of polarization separation films and retardation films (half-wave plates). The polarization converter 36 converts the polarization directions of fluorescence YL into the polarization direction of one of the polarized components.

The illumination light WL having passed through the polarization converter 36 enters the superimposing lens 37. The illumination light WL having exited out of the superimposing lens 37 enters the color separation system 3. The superimposing lens 37 superimposes the plurality of thin pencils of light described above, which form the illumination light WL, on one another in the illumination receiving regions, that is, the image formation regions of the light modulators 4R and 4G so that the regions are uniformly illuminated.

As described above, the wavelength converter 25 according to the present embodiment includes the substrate 252, which has the support surface 2521, the first optical member 254, which includes the first optical layer 2542, which faces the support surface 2521 and transmits the excitation light EL incident from the side opposite from the substrate 252, the phosphor layer 251, which is disposed at the support surface 2521, has the front surface 2514, on which the excitation light EL having exited out of the first optical layer 2542 is incident, and converts the excitation light EL into the fluorescence YL, which has the yellow wavelength band, the light emitting portion 260, which is formed of at least the substrate 252 and the first optical member 254 and emits light, and the second optical member 257, which includes the second optical layer 2572, which reflects the excitation light EL and transmits the fluorescence YL and is disposed at the light emitting portion 260. The first optical layer 2542 inclines with respect to the front surface 2514 and reflects the fluorescence YL. The phosphor layer 251 has the first layer 2510, on which the excitation light EL having passed through the first optical layer 2542 is incident, and the second layer 2511, which is located at the side of the first layer 2510 facing the substrate 252, on which the excitation light EL having passed through the first layer 2510 is incident, and scatters the excitation light EL by a degree greater than the degree by which the first layer 2510 scatters the excitation light EL. Part of the excitation light EL1 scattered in the second layer 2511 enters the first layer 2510 and is converted into the fluorescence YL.

The wavelength converter 25 according to the present embodiment, in which the first layer 2510 having low fluorescence conversion efficiency is located at the side of the phosphor layer 251 facing the front surface 2514, on which the excitation light EL is incident, allows the excitation light EL to efficiently enter the second layer 2511 having high fluorescence conversion efficiency. Furthermore, the excitation light EL1 backscattered in the second layer 2511 can be converted into the fluorescence YL in the first layer 2510.

The excitation light EL emitted from the light source 22 can therefore be efficiently converted into the fluorescence YL and extracted from the light emitting portion 260.

The wavelength converter 25 according to the present embodiment, in which the fluorescence YL is extracted at the increased efficiency, can therefore generate bright illumination light WL.

In the wavelength converter 25 according to the present embodiment, the area of the light emitting portion 260 can be regarded as an apparent fluorescence emission area. The wavelength converter 25 according to the present embodiment can therefore reduce the etendue of the illumination light WL. The wavelength converter 25 according to the present embodiment, which allows reduction in the etendue without reduction in the area, of the phosphor layer 251, on which the excitation light EL is incident, can suppress a decrease in the fluorescence conversion efficiency due to an increase in the optical density of the excitation light EL on the phosphor layer 251.

The wavelength converter 25 according to the present embodiment allows generation of the illumination light WL formed of the bright fluorescence YL having reduced etendue while suppressing an increase in the optical density of the excitation light EL.

The first light source apparatus 20 according to the present embodiment includes the light source 22, which emits the excitation light EL, and the wavelength converter 25.

The first light source apparatus 20 according to the present embodiment, which efficiently extracts the fluorescence, can output bright illuminator light WL.

The projector 1 according to the present embodiment includes the first light source apparatus 20, the second light source apparatus 21, the light modulators 4G and 4R, which modulate the illumination light WL from the first light source apparatus 20, the light modulator 4B, which modulates the blue light LB from the second light source apparatus 21, and the projection optical apparatus 6, which projects the image light described above.

The projector 1 according to the present embodiment, which includes the first light source apparatus 20, which generates the bright illumination light WL, can form and project a high-luminance image.

Second Embodiment

Another configuration of the light source apparatus will be subsequently described as a second embodiment of the present disclosure. The present embodiment and the first embodiment differ from each other in the structure of the wavelength converter, and the configuration of the wavelength converter will therefore be primarily described below. In the present embodiment, configurations or members common to those in the first embodiment have the same reference characters and will not be described in detail.

Figure 6:
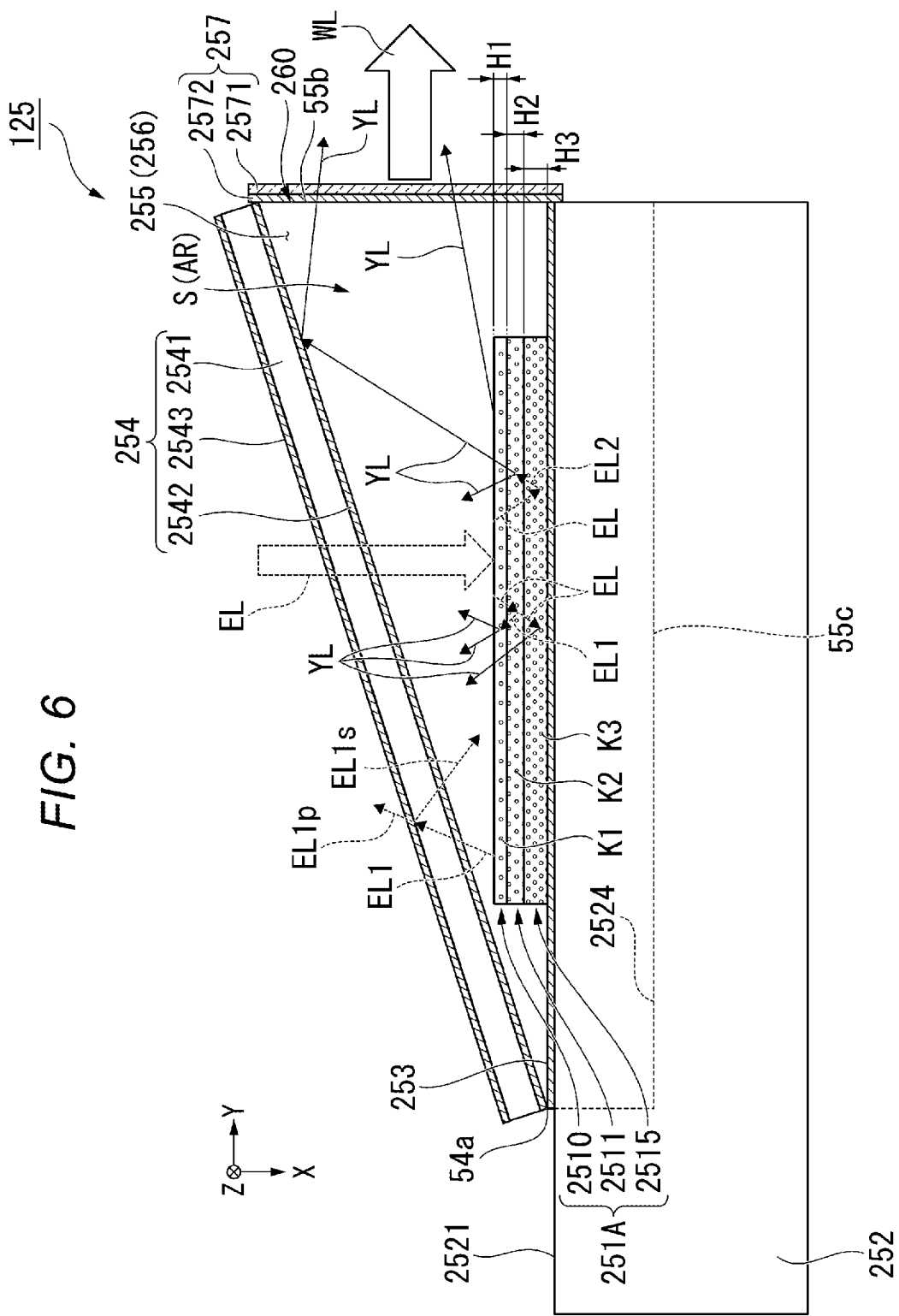
FIG. 6 is a cross-sectional view of the wavelength converter according to a second embodiment.

FIG. 6 is a cross-sectional view of the wavelength converter according to the present embodiment taken along a plane along the plane XY. FIG. 6 corresponds to FIG. 5 in the first embodiment.

The wavelength converter 125 according to the present embodiment includes a phosphor layer (wavelength conversion layer) 251A, the substrate 252, the mirror layer 253, the first optical member 254, the second optical member 257, the third optical member 255, the fourth optical member 256, and the light emitting portion 260, as shown in FIG. 6.

The phosphor layer 251A in the present embodiment has a three-layer structure, unlike the phosphor layer 251 in the first embodiment. Specifically, the phosphor layer 251A includes the first layer 2510, the second layer 2511, and a third layer 2515. The first layer 2510, the second layer 2511, and the third layer 2515 are sintered into a single piece. The first layer 2510, the second layer 2511, and the third layer 2515 may be bonded to each other via optical contact into a single piece.

In the phosphor layer 251A, the third layer 2515 is a portion located at the side of the second layer 2511 facing the positive end of the direction X (facing substrate 252). The excitation light EL having passed through the second layer 2511 enters the third layer 2515, as will be described later.

In the present embodiment, the degree by which the third phosphor layer 2515 scatters light is greater than the degree by which the second phosphor layer 2511 scatters light. The third layer 2515 contains a plurality of third scatterers K3 formed of pores. The number of third scatterers K3 contained in the third layer 2515 is greater than the number of second scatterers K2 contained in the second layer 2511. Therefore, the degree by which the third layer 2515 scatters light is greater than the degree by which the first layer 2510 scatters light, and the number of third scatterers K3 contained in the third layer 2515 is greater than the number of first scatterers K1 contained in the first layer 2510.

The second layer 2511 scatters light by a degree smaller than the degree by which the third layer 2515 scatters light to lower the efficiency of the conversion into the fluorescence YL.

In the present embodiment, a thickness H3 of the third layer 2515 is greater than the thickness H2 of the second layer 2511. That is, in the phosphor layer 251A in the present embodiment, the first layer 2510, the second layer 2511, and the third layers 2515 are arranged in ascending order of thickness.

In the phosphor layer 251A in the present embodiment, suppressing the degree by which the third layer 2515 scatters light and the thickness of the third layer 2515 as compared with those for the second layer 2511 allows the efficiency of the conversion into the fluorescence YL to increase in the order of the first layer 2510, the second layer 2511, and the third layer 2515. The first layer 2510 and the second layer 2511 can therefore transmit most of the excitation light EL incident from the light source 22 without converting the excitation light EL into the fluorescence YL, and cause the excitation light EL to enter the third layer 2515 provided at the side facing the substrate 252.

The third layer 2515 has the highest fluorescence conversion efficiency among the layers of the phosphor layer 251A as described above, and therefore efficiently converts the excitation light EL passing through the first layer 2510 and the second layer 2511 and incident therefrom into the fluorescence YL. In the third layer 2515, part of the excitation light EL is scattered backward and enters the second layer 2511 or the first layer 2510. The excitation light EL backscattered in the third layer 2515 is hereinafter referred to as excitation light EL2.

Since the excitation light EL2 scattered in a variety of directions enters the second layer 2511 or the first layer 2510, the excitation light EL2 is efficiently converted into the fluorescence YL in the second layer 2511 or the first layer 2510.

The phosphor layer 251A in the present embodiment, in which the efficiency of the conversion into the fluorescence YL increases in the order of the first layer 2510, the second layer 2511, and the third layer 2515, suppresses a decrease in fluorescence conversion efficiency of the entire phosphor layer. Furthermore, the phosphor layer 251A in the present embodiment, in which the first layer 2510 converts the excitation light EL1 backscattered in the second layer 2511 into the fluorescence YL, and the second layer 2511 or the first layer 2510 converts the excitation light EL2 backscattered in the third layer 2515 into the fluorescence YL, can efficiently convert the excitation light EL emitted from the light source 22 into the fluorescence YL.

As described above, the wavelength converter 125 according to the present embodiment includes the phosphor layer 251A including the first layer 2510, the second layer 2511, and the third layer 2515, the wavelength conversion efficiency of which increases in the direction in which the excitation light EL is incident. The excitation light EL thus efficiently enters the second layer 2511 and the third layer 2515, which each have fluorescence conversion efficiency higher than that of the first layer 2510 and can efficiently generate the fluorescence YL.

Furthermore, the first layer 2510 can convert the excitation light EL1 backscattered in the second layer 2511 into the fluorescence YL, and the second layer 2511 or the first layer 2510 can convert the excitation light EL2 backscattered in the third layer 2515 into the fluorescence YL.

The wavelength converter 125 according to the present embodiment can therefore efficiently convert the excitation light EL emitted from the light source 22 into the fluorescence YL to extract the fluorescence YL at increased efficiency.

The first light source apparatus 20 according to the present embodiment, which includes the wavelength converter 125 described above, can therefore generate bright illumination light WL containing the efficiently extracted fluorescence YL.

The present disclosure has been described with reference to the embodiments by way of example but is not necessarily limited to the embodiments described above, and a variety of changes can be made thereto to the extent that the changes do not depart from the intent of the present disclosure.

For example, the first embodiment has been described with reference to the case where the reduced number of scatterers in the first layer 2510 and the reduced thickness thereof as compared with the second layer 2511 suppress the fluorescence conversion efficiency of the first layer 2510 and allow the excitation light EL to readily pass through the first layer 2510. Instead, only one of the number of scatterers in the first layer 2510 and the thickness thereof may be adjusted to control the fluorescence conversion efficiency.

The aforementioned embodiments have been described with reference to the case where the light emitting portion 260 is formed by the substrate 252, the first optical member 254, the third optical member 255, and the fourth optical member 256. Instead, at least the substrate 252 and the first optical member 254 may instead form the light emitting portion.

The aforementioned embodiments have been described with reference to the case where the first optical member 254, the third optical member 255, and the fourth optical member 256 are formed of separate members. Instead, the first optical member 254, the third optical member 255, and the fourth optical member 256 may be integrated into a single member.

The aforementioned embodiments have been described with reference to the case where the direction-Z width of the phosphor layers 251 and 251A is smaller than the direction-Z width of the support surface 2521 located in the housing space S. Instead, the direction-Z width of the rear surface 2513 of the phosphor layers 251 and 251A may be equal to the direction-Z width of the support surface 2521 located in the housing space S. In this case, the side surface 2512 of the phosphor layers 251 and 251A is in contact with the third optical member 255 and the fourth optical member 256, so that the fluorescence YL emitted via the side surface 2512 is reflected off the third optical member 255 and the fourth optical member 256 back into the phosphor layers 251 and 251A.

In the embodiments described above, the projector 1 including theee light modulators 4R, 4G, and 4B has been presented byway of example, and the present disclosure is also applicable to a projector that displays color video images via one light modulator. Furthermore, the light modulators are not limited to the liquid crystal panels described above and can instead, for example, be digital mirror devices.

In the embodiments described above, the light source apparatus according to the present disclosure is used in a projector by way of example, but not necessarily. The light source apparatus according to the present disclosure may be used as a lighting apparatus, such as a headlight of an automobile.

The present disclosure will be summarized below as additional remarks.

Additional Remark 1

A wavelength converter including a substrate having a support surface, a first optical member including a first optical layer that faces the support surface and transmits first light having a first wavelength band and incident from a side opposite from the substrate, a wavelength conversion layer that is disposed at the support surface, has a light incident surface on which the first light that exits out of the first optical layer is incident, and converts the first light into second light having a second wavelength band different from the first wavelength band, a light emitting portion that is formed by at least the substrate and the first optical member and emits light, and a second optical member including a second optical layer that reflects the first light and transmits the second light, and disposed at the light emitting portion, wherein the first optical layer inclines with respect to the light incident surface and reflects the second light, the wavelength conversion layer includes a first layer that the first light passing through the first optical layer enters, and a second layer which is located at a side of the first layer facing the substrate, which the first light passing through the first layer enters, and which scatters the first light by a degree greater than a degree by which the first layer scatters the first light, and part of the first light scattered in the second layer enters the first layer and is converted into the second light.

The thus configured wavelength converter, in which the first layer having low wavelength conversion efficiency is provided at the light incident side of the wavelength conversion layer, the side on which the first light is incident, allows the first light to efficiently enter the second layer having high wavelength conversion efficiency. The first light backscattered in the second layer can be converted into the second light in the first layer.

The first light can therefore be efficiently converted into the second light, which can then be extracted out of the light emitting portion. The thus configured wavelength converter, which allows an increase in the second light extraction efficiency, can therefore generate bright illumination light.

Additional Remark 2

The wavelength converter described in the additional remark 1, in which the wavelength conversion layer contains a plurality of scatterers, and a content of the plurality of scatterers per volume of the second layer is greater than a content of the plurality of scatterers per volume of the first layer.

The configuration described above can readily achieve a configuration in which the degree by which the second layer scatters the first light is greater than the degree by which the first layer scatters the first light.

Additional Remark 3

The wavelength converter described in the additional remark 2, in which the plurality of scatterers are pores.

The configuration described above, in which a low refractive index of the scatterers increases the difference in refractive index at the interface of the scatterers, allowing enhancement of the scattering characteristics of the wavelength conversion layer.

Additional Remark 4

The wavelength converter described in any one of the additional remarks 1 to 3, in which the second layer is thicker than the first layer.

The configuration described above allows the first light to pass through the first layer and enter the second layer more efficiently than in a case where the first and second layers have the same thickness. Also, the second layer having a large thickness can efficiently convert the first light into the second light.

Additional Remark 5

The wavelength converter described in any one of the additional remarks 1 to 4, in which the wavelength conversion layer further includes a third layer that is located at a side of the second layer facing the substrate, that the first light passing through the second layer enters, and that scatters the first light by a degree greater than a degree by which the second layer scatters the first light, and part of the first light scattered in the third layer enters the second or first layer and is converted into the second light.

According to the configuration described above, the first light having passed through the first and second layers and backscattered in the third layer can be converted into the second light in the second or first layer. The efficient conversion of the first light into the second light therefore increases the second light extraction efficiency, whereby brighter illumination light can be generated.

Additional Remark 6

The wavelength converter described in any one of the additional remarks 1 to 5, in which the first layer and the second layer are sintered into a single piece.

According to the configuration described above, the first and second layers of the wavelength conversion layer can be bonded to each other without use of an adhesive.

Additional Remark 7

The wavelength converter described in any one of the additional remarks 1 to 6, in which the first light that enters the first optical member from the side opposite from the substrate is polarized in a first direction, and the first optical member further includes a third optical layer that is disposed at a side of the first optical layer opposite from the substrate, transmits the first light polarized in the first direction, and reflects the first light polarized in a second direction different from the first direction.

According to the configuration described above, in which the first optical layer reflects the first light that is emitted from the wavelength conversion layer, passes through the first optical layer, and is polarized in the second direction, the reflected first light can be used to convert the second light again in the wavelength conversion layer. The first light utilization efficiency can therefore be further improved.

Additional Remark 8

The wavelength converter described in the additional remark 7, in which the first light polarized in the first direction is P-polarized light with respect to the third optical layer.

According to the configuration described above, in which the first light passes through the third optical layer, the first light can be efficiently captured into the first optical member.

Additional Remark 9

The wavelength converter described in any one of the additional remarks 1 to 8, further includes a third optical member including a fourth optical layer that reflects the first and second light, the fourth optical layer being disposed so as to intersect with the support surface and the first optical layer, and a fourth optical member including a fifth optical layer that reflects the first and second light, the fifth optical layer being disposed so as to intersect with the support surface and the first optical layer and face the fourth optical layer, and the light emitting portion is formed by the substrate, the first optical member, the third optical member, and the fourth optical member.

The configuration described above, in which light leakage from portions excluding the light emitting portion is suppressed, allows the light to be efficiently emitted via the light emitting portion.

Additional Remark 10

A light source apparatus including a light source that emits the first light, and the wavelength converter described in any one of the additional remarks 1 to 9.

The thus configured light source apparatus, which efficiently extracts the second light, can output bright illuminator light.

Additional Remark 11

A projector including the light source apparatus described in the additional remark 10, a light modulator that modulates light from the light source apparatus, and a projection optical apparatus that projects the light modulated by the light modulator.

The thus configured projector includes the light source apparatus, which generates bright illumination light, can form and project a high-luminance image.

What is claimed is:

1. A wavelength converter comprising:
a substrate having a support surface;
a first optical member including a first optical layer that faces the support surface and transmits first light having a first wavelength band, the first light being incident from a side opposite from the substrate to the first optical layer;
a wavelength conversion layer disposed at the support surface and having a light incident surface on which the first light that exits out of the first optical layer is incident, the wavelength conversion layer being configured to convert the first light into second light having a second wavelength band different from the first wavelength band;
a light emitting portion formed by at least the substrate and the first optical member; and
a second optical member disposed at the light emitting portion and including a second optical layer that reflects the first light and transmits the second light,
wherein the first optical layer inclines with respect to the light incident surface and reflects the second light,
the wavelength conversion layer includes
a first layer that the first light having passed through the first optical layer enters, and
a second layer disposed between the first layer and the substrate,
the first light having passed through the first layer enters the second layer,
the second layer scatters the first light by a second degree greater than a first degree by which the first layer scatters the first light, and
part of the first light scattered in the second layer enters the first layer and is converted into the second light.

2. The wavelength converter according to claim 1, wherein the wavelength conversion layer contains a plurality of scatterers, and
a second content of the plurality of scatterers per volume of the second layer is greater than a first content of the plurality of scatterers per volume of the first layer.

3. The wavelength converter according to claim 2, wherein the plurality of scatterers are pores.

4. The wavelength converter according to claim 1, wherein the second layer is thicker than the first layer.

5. The wavelength converter according to claim 1, wherein the wavelength conversion layer further includes a third layer disposed between the second layer and the substrate,
the first light having passed through the second layer enters the third layer,
the third layer scatters the first light by a third degree greater than the second degree by which the second layer scatters the first light, and
part of the first light scattered in the third layer enters the second or first layer and is converted into the second light.

6. The wavelength converter according to claim 1, wherein the first layer and the second layer are sintered into a single piece.

7. The wavelength converter according to claim 1, wherein the first light that enters the first optical member from the side opposite from the substrate is polarized in a first direction,
the first optical member further includes a third optical layer disposed at a side of the first optical layer opposite from the substrate, and
the third optical layer transmits the first light polarized in the first direction and reflects the first light polarized in a second direction different from the first direction.

8. The wavelength converter according to claim 7, wherein the first light polarized in the first direction is P-polarized light with respect to the third optical layer.

9. The wavelength converter according to claim 1, further comprising:
a third optical member including a fourth optical layer that reflects the first and second lights, the fourth optical layer intersecting with the support surface and the first optical layer; and
a fourth optical member including a fifth optical layer that reflects the first and second lights, the fifth optical layer intersecting with the support surface and the first optical layer and facing the fourth optical layer,
wherein the light emitting portion is formed by the substrate, the first optical member, the third optical member, and the fourth optical member.

10. A light source apparatus comprising:
a light source that emits the first light; and
the wavelength converter according to claim 1.

11. A projector comprising:
the light source apparatus according to claim 10;
a light modulator that modulates light emitted from the light source apparatus; and a projection optical apparatus that projects the light modulated by the light modulator.

\* \* \* \* \*